United States Patent

Ghose et al.

[15] 3,699,444

[45] Oct. 17, 1972

[54] INTERFERENCE CANCELLATION SYSTEM

[72] Inventors: Rabindra N. Ghose, Los Angeles; Walter A. Sauter, Malibu, both of Calif.

[73] Assignee: American Nucleonics Corporation, Glendale, Calif.

[22] Filed: Feb. 17, 1969

[21] Appl. No.: 799,781

[52] U.S. Cl. ........................325/21, 325/23, 343/180

[51] Int. Cl. ..............................................H04b 1/56

[58] Field of Search..........325/15, 21, 22, 23, 24, 65, 325/67, 363; 343/5.1, 80; 333/17

[56] References Cited

UNITED STATES PATENTS

| | | | |
|---|---|---|---|
| 3,021,521 | 2/1962 | Hutchins | 333/17 X |
| 2,818,501 | 12/1957 | Stavis | 343/180 |
| 3,009,150 | 11/1961 | Castriota et al. | 343/180 |
| 3,155,965 | 11/1964 | Harmer | 343/5 |
| 3,193,775 | 7/1965 | Herrero et al. | 333/17 X |
| 3,045,185 | 7/1962 | Mathwich | 343/176 X |

*Primary Examiner*—Benedict V. Safourek
*Attorney*—John E. Wagner

[57] ABSTRACT

This invention relates to radio communication systems and more particularly to systems for minimizing or eliminating interference in radio receivers. The invention is more particularly directed towards the elimination of interference in radio receivers from strong adjacent transmitters having signal levels several orders of magnitude stronger than the wanted signal. This system includes means for sampling the unwanted or interference signal and linearly processing it to develop a signal that is related to the incoming signal as a relatively time invariant ratio. The system includes means for adding the derived signal to the received signal to effectively cancel the interference signal.

2 Claims, 7 Drawing Figures

INVENTORS
RABINDRA N. GHOSE
WALTER A. SAUTER
BY
John E. Wagner

INVENTORS.
RABINDRA N. GHOSE
WALTER A. SAUTER

BY John E. Wagner

ATTORNEY

INTERFERENCE CANCELLATION SYSTEM

BACKGROUND OF THE INVENTION

The problem of eliminating interference signals at the input of radio receivers is as old as radio communication itself. Normally this is accomplished through receiver circuits tuned to pass only the wanted carrier signal and its information carrying sidebands. Using the best state of the art frequency selective devices such as mechanical or tuned cavity filters, receivers can be provided with 50–70 db suppression of interference caused by transmitters operating on adjacent channels that are separated in frequency by plus or minus one per cent.

The necessary channel separation severely limits the total number of transmission channels available within any fixed band. One solution is time shared operation as in a transceiver where the transmitter is inoperative during receiver operation and vice versa. This mode of operation severely limits the total information capacity of the system. Where transmissions are relatively random and uncontrolled, time sharing is valueless.

Efficient use of frequency spectrum dictates that:

1. All channels must be simultaneously operative;
2. Required channel separation should not exceed ±0.1 percent;
3. Adjacent channel interference suppression should exceed 60 db.

These needs can be filled only by an active interference suppression system that senses the interference signal and generates a cancellation signal which cancels the interference signal before it reaches the receiver.

Prior active systems of this type have achieved only limited success. Design of such systems has heretofore presented an extremely difficult problem because the interfering signal will vary both in amplitude and phase. Attempts to design a system to provide a cancelling signal that varies both its amplitude and phase have been unsuccessful because of the inability of existing circuitry and devices to detect accurately and correct in the amplitude and phase errors at the required rate.

BRIEF STATEMENT OF THE INVENTION

A general object of this invention is to produce a method of radio interference cancellation which operates by detecting or sampling the interference signal alone and by linear processing the interference signal itself to produce the required cancellation signal.

One more specific object of this invention is to provide a signal cancellation system for radio transmitter receiver stations which linearly processes the transmitted signal to provide an effective transmitter interference cancellation signal for addition to the received signal.

Another object of this invention is to generate a signal having a precise amplitude ratio and phase angle with respect to an input or reference signal.

Still another object of this invention is to provide a method for controlling the amplitude ratio and phase angle of an output signal with respect to an input signal using two similar amplitude control systems.

One other object of this invention is to control the output signal over a large dynamic range regardless of polarity.

One additional object of this invention is to provide a method of interference cancellation that can eliminate interference from multipath transmissions as well as adjacent transmitters.

This invention is based primarily upon the realization that by linearly processing the interference signal itself, the resultant signal has the same spectral composition as the original interference and with the correct adjustment in amplitude and phase of the processed signal a precise effective cancellation signal may be produced.

We have further discovered that it is possible to sense an interfering signal and through an appropriate transformation produce a correction signal which has a ratio to the input signal that is relatively time invariant and when added to a received signal applies appropriate amplitude and phase corrections to cancel the interference. Our discovery is based upon the realization that although the amplitude and phase of the interfering signal will vary at unpredictable rates, the required cancellation signal has a relatively fixed relationship to the amplitude and phase of the input (sample) signal. Furthermore, that this relationship can be defined as two time quadratured amplitude ratios which can be individually varied to generate a cancellation signal with any arbitrary amplitude and phase angle.

We have further discovered that it is possible to provide both amplitude and phase angle control of a radio frequency signal by means of a control circuit which produces two time quadratured amplitude correction signals.

We have further discovered a means for rendering the system immune from interference that could be transmitted to the receiver from sources between the receiving antenna and the output of the interference cancellation system.

DESCRIPTION OF THE DRAWING

This invention may be more clearly understood from the following detailed description and by reference to the drawing in which.

Figure 1:
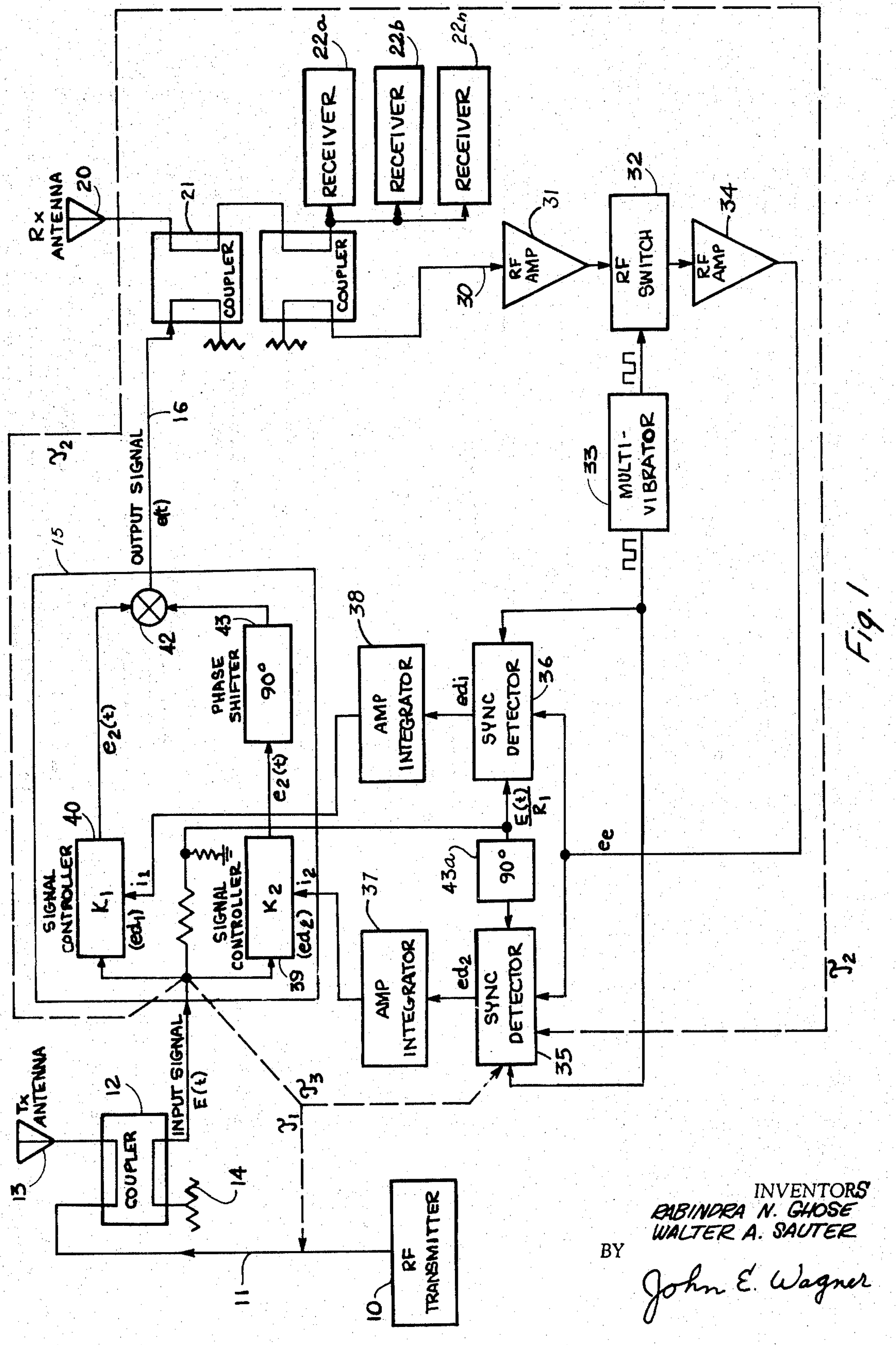
FIG. 1 is a block diagram of the system of this invention.

Now refer to FIG. 1 wherein a typical system incorporating this invention may be seen. It includes a transmitter 10 connected through a line 11 and a coupler 12 to an antenna 13. The signal $E(t)$ from the transmitter 10 may be any of the well known forms of modulation such as amplitude, phase, pulse or frequency and operates in the LF to microwave frequency range. The coupler 12 is used to sample the transmitted signal $E(t)$ at an attenuated level determined by the coupling ratio of coupler 12. The attenuated sampled signal represented as $E(t)/R$ is introduced into a signal amplitude ratio and phase angle control circuit 15 which is described in more detail below. Suffice it to say, the control circuit 15 produces an output signal cancellation signal $e(t)$ which is coupled through line 16 and a coupler 21 to a receiving system made up of a receiving antenna 20 and one or more receivers **22*a–n***. The receivers 22*a–n* normally are each tuned to a different communication channel and energized to receive transmissions from outlying stations. A typical example of a system of this type is a police or emergency radio network with a number of remote transmitters and a central control station with one or more transmitters and receivers continuously tuned to each remote transmitter. The local central transmitter may operate during periods of incoming transmissions and the antenna 20 will pick up the transmitted signals at levels significantly above the wanted incoming transmission. If the signal $e(t)$ coupled to the receiver channel constitutes the negative complement of the transmitted signal $E(t)$, the interference at the receiving channel will be cancelled.

Signal cancellation is accomplished employing dual synchronous detector-demodulator circuits providing d.c. signals for the control circuit 15. Specifically, the output signal to the receiver input is sampled and transmitted over line 30, amplified in RF amplifier 31 and introduced into the input of RF switch 32. This switch 32 is operated by a free-running multivibrator 33 which provides a chopper stabilization function for the control system. Multivibrator 33 operates for example at 10KHz and modulates the incoming signal at that rate. The modulated signal is again amplified in RF Amplifier 34 and applied to two synchronous detectors 35 and 36 producing two voltages which are the synchronous detection products of the sampled receiver signal $e_e$ and the sampled transmitter signal $E(t)/R$ identified as $e_{d2}$ and $e_{d1}$. These voltages in turn drive their respective amplifier-integrators 37 and 38 producing sine and cosine dc control voltages for the interference cancellation circuit 15. These sine and cosine control signals, termed $i_1$ and $i_2$ are applied to respective signal controller 40 and 39. The signal controllers 39 and 40 illustrated in more detail in FIGS. 3, 4, and 5 receives the transmitted input signal $E(t)/R$ from coupler 12 and modify that signal in amplitude only as a function of the level of the respective current $i_1$ and $i_2$. The modified signals from controllers 40 and 39 identified as $e_1(t)$ and $e_2(t)$ are then summed in adder 42 after the signal $e_2(t)$ is shifted 90° in phase in phase shifter 43. The output of adder 42, error correction signal $e(t)$, is then applied as indicated above through line 16 to the receiving circuit.

Operation of the system is best described as follows:

The input or reference signal $E(t)/R$ from the transmitter 10 and coupler 12 is split into two parts. Each part is amplitude controlled as a separate factor. After amplitude control, these two parts $e_1(t)$ and $e_2(t)$ are combined after a 90° phase shift of $e_2(t)$. Let the reference signal be denoted by $$E(t)/R = A(t)\,[\sin\omega t + \phi(t)] \quad (1)$$

and the output of the controller 40 where the gain modification factor $K_1$ is $$e_1(t) = A(t)K_1[\sin\omega t + \phi(t)] \quad (2)$$

and the output of the controller 39 is $$e_2(t) = A(t)K_2[\sin\omega t + \phi(t)] \quad (3)$$

The combined outputs of the two controllers after phase shifting and combining in adder 42 then becomes $$e(t) = A(t)\,\bar{K}[\sin\omega t + \phi(t) + \psi] \quad (4)$$

where $$K_1 = \bar{K}\cos\psi \quad (5)$$

and $$K_2 = \bar{K}\sin\psi \quad (6)$$

A comparison between $E(t)/R$ and $e(t)$ $$E(t)/R = A(t)]\sin\omega t + \phi(t)] \quad (1)$$

$$e(t) = A(t)\,\bar{K}[\sin\omega t = \phi(t) + \psi] \quad (4)$$

shows that their spectral characteristics are identical and their amplitude differs by $\bar{K}$ and phase angle of one differs from the other by $\psi$.

As stated earlier this is a precise relation regardless of the reference signal amplitude phase or rate of change of either. Thus if it is assumed that the reference signal is reduced by a factor of $\bar{K}$ in amplitude and delayed by a phase angle $\psi$ with respect to the sampling point, signal control reduces to the problem of maintaining the correct values of factors $K_1$ and $K_2$. Both these factors are relatively time independent functions and need not vary at the RF frequencies involved. Furthermore since $K_1$ and $K_2$ can be changed by command, the delivery of a signal with a specific amplitude and phase angle on a continuous basis becomes considerably simplified and more accurate.

The output signal $e(t)$ can be made to have the proper amplitude and phase to cancel the transmitted signal $E(t)$ at the receiving antenna.

This system with the relative gain levels of the control loop properly adjusted will produce more than 60 db suppression of signals with less than 0.1 percent deviation from the wanted incoming carrier. This method of direct signal processing also eliminates the inherent time lag in active cancellation systems employing synthesization.

Figure 2:
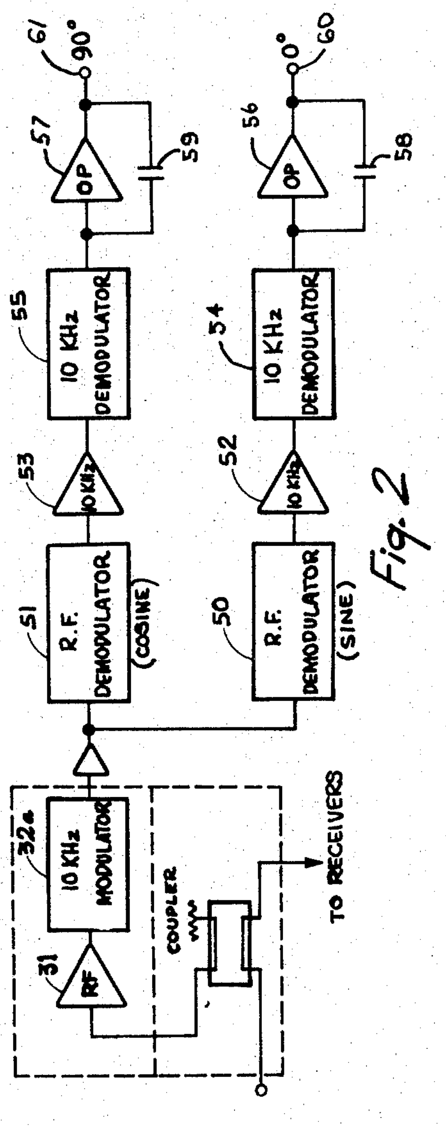
FIG. 2 is a block diagram of the control signal generator portions of the system of FIG. 1.

In carrying out this invention it was determined that any active interference cancellation system producing such a precise instantaneous correction signal by processing the transmitted and received signals can be disturbed by stray signals from other sources which would cause the correction loop to operate incorrectly. We have eliminated this difficulty by employing the arrangement of FIG. 2. As shown in FIG. 2 the received signal is connected through a coupler 21 to the receivers. The coupled signal is applied to an RF amplifier 31 and a 10KHz modulator 32*a*. These components are enclosed within an RF shield so that the interference cancellation system reacts only the signals being delivered to the receivers.

The RF signal is modulated at a preselected frequency such as 10KHz. The amplified modulated RF signal is applied to two demodulators 50 and 51 which remove the RF carrier. After amplification by ac amplifiers 52 and 53, the two signals are demodulated to remove the 10KHz carrier by demodulators 54 and 55. The signals are then integrated by their respective operational amplifiers 56 and 57 each with feedback capacitors 58 and 59. The signal at terminals 60 and 61 comprise the sine and cosine control signal illustrated in FIG. 1.

Employing the arrangement of FIG. 2, dc offsets and interferences that are not modulated at the 10KHz rate are blocked by the ac amplifiers 52 and 53 and the demodulators 54 and 55. Each resultant stabilized error signal drives its integrator until each detected signal is driven to a null.

The critical elements of the correction system of FIG. 1, given the two amplitude controlled correction signals $i_1$ and $i_2$, are the controllers 39 and 40. These controllers receive the RF signal $E(t)/R$ and under the control of the respective dc signals $i_1$ and $i_2$ produce the output signals $e_1(t)$ and $e_2(t)$ having the required precise amplitude ratio to the input RF signal. This is obtained using the basic circuit of FIG. 3. It comprises a coupling device such as transformer 70 with the primary winding 71 connected to the source of the RF reference signal and the secondary winding shunted by a variable potentiometer 72 including a wiper arm 73. The potentiometer includes means 74 for adjusting the position of the wiper arm 73 responsive to the level of the input control signal. The transformer winding center tap 75 is grounded. Polarity reversal is provided by operating on the appropriate half of the potentiometer. This circuit provides all the necessary requisites for the controllers 39 and 40 of FIG. 1.

Figure 3:
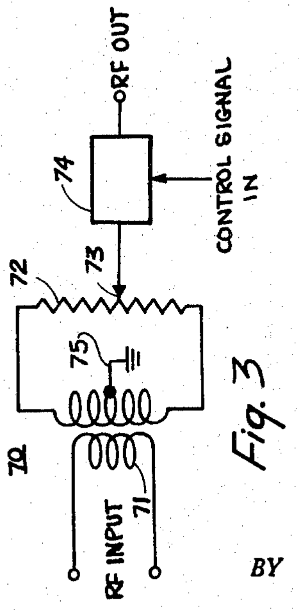
FIG. 3 is an electrical schematic of a representative form of electromechanical signal level controller.

This signal controller of FIG. 3 may be used in duplicate in the system of FIG. 1 in the boxes 39 and 40 of the interference cancellation circuit 15. It acts as a variable ratio controller producing only amplitude changes in the sampled interference signal, without significant phase shift. Since only amplitude control of the interference signal is required for operation of the system, the form of variable potentiometer control of FIG. 3 is preferred. It is possible however to use other forms of signal controllers and produce an effective operating system. For example, a variable coupling system may be used. Such a signal controller is shown in FIG. 4.

Figure 4:
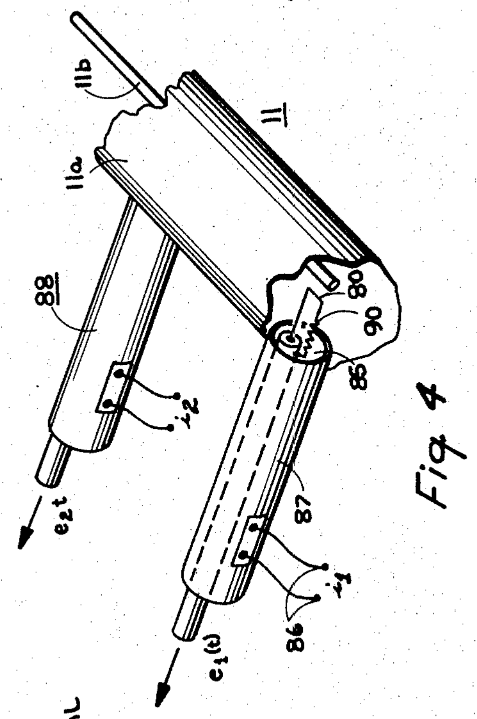
FIG. 4 is a simplified showing of a variable inductive coupler capable of producing the required signal control for this invention.

Now refer to FIG. 4 where a variable coupling form of signal controller is shown. It includes a coaxial transmission line 11 including an outer conductor or shell 11*a* and a central conductor 11*b* constituting the transmitter antenna cable of FIG. 1. Extending through one wall of the shell 11*a* is a coupling loop 80 extending into the coaxial line 11*a* to extract a portion of the energy transmitted down the line 80. The energy extracted from the transmission line is a function of the position of the coupling loop in the line in accordance with well known practice in the coaxial line transmission art. The probe 80 is mounted on a central cylinder 85 which is moved longitudinally by an electrically actuated translation device 87 or other means to produce positional corrections. The control signal $i_1$ is introduced into terminal 86. The sampling loop is terminated in an attenuator 90. The output of the sampling loop is proportional to its area and the strength of the field which it intercepts. The strength of the field increases as the loop is moved toward the central conductor 11b.

A similar variable coupler 88 samples the same coaxial line to produce the signal $e_2t$ as an independent function of current $e_2$.

Polarity reversal can be provided by a switching relay or its equivalent or by summing with a smaller fixed signal of opposite polarity. The signal $e_2(t)$ will be shifted in phase 90° with respect to signal $e_1(t)$ by phase shifter 43 and the two components $e_1t$ and $e_2t$ (−90°) will be added on proper relative phase at adder 42. The phase delay resultant from any inductive characteristics of the controllers of FIG. 4 can be easily compensated in the remainder of the interference cancellation servo loop.

Figure 5:
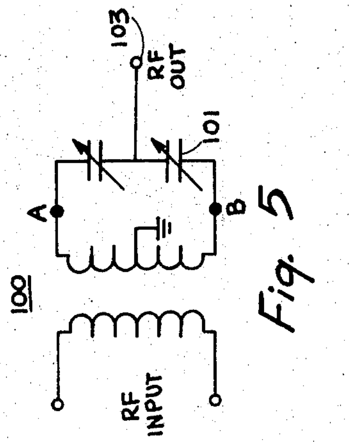
FIGS. 5–5*b* are simplified showings of a variable capacitative coupler for controlling the level of the correction signal.

Another form of signal controller is illustrated in FIG. 5. It employs variable capacitative coupling to control the amplitude of the input signal $E(t)/R$ in each of the controllers 39 and 40. It comprises a coupling device 100 such as a transformer or a 180° hybrid producing two equal voltages with opposite polarities applied each to one plate of a pair of variable capacitances 101 or 102 having the other plate connected to a common output terminal 103. The capacitances 102 and 103 are adjustable to vary the level and polarity of the output signal.

Figure 5A:
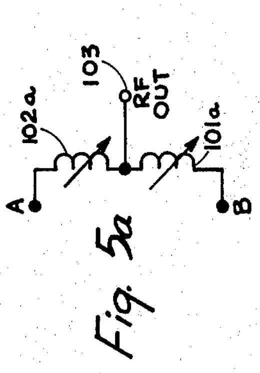
Figure 5B:
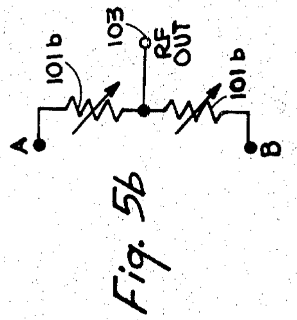

The inductive and resistive equivalents of the controller of FIG. 5 are shown in FIGS. 5*a* and 5*b*. The foregoing are examples of different ways of implementing the system of FIG. 1 to provide effective interference cancellation from an adjacent transmitter. The same system is able to eliminate unwanted multipath or ghost transmissions as well. This may be understood after a more complete analysis of the method and system of interference cancellation of this invention.

DETAILED EXPLANATION OF THE OPERATION OF THE INTERFERENCE CANCELLATION METHOD AND SYSTEM

Let it be assumed that interference appears at the receiving antenna 20 through multipaths. Let the sampled signal $E(t)/R$ from the Transmitter $T_1$ be $$E(t)/R = A(t)\sin[\omega t + \phi(t)] \quad (1)$$

as indicated in Eq. (1). This signal appears at the two signal controllers 39 and 40 which change the amplitudes of their inputs by factors $K_1$ and $K_2$. The outputs of the signal controllers are then summed at adder 42 after $e_2t$ is shifted −90° in Phase Shifter 43.

The cancelling signal $e_t$ appearing at the summing point of the receiver, can be expresses as:

$$e_t = A(t)\sin[\omega t + \phi(t) + \omega(\tau_1+\tau_2)]K_1f_1$$
$$+ A(t)\cos[\omega t + \phi(t) + \omega(\tau_1+\tau_2)]K_1f_2 \quad (7)$$

where $\tau_1$ and $\tau_2$ are the time delays in the paths shown in FIG. 1. If the received interference is $$e_R = A(t)K(t)\sin[\omega t + \phi(t) + \omega\tau] \quad (8)$$

the error signal which must be used to reset the values of $K_1$ and $K_2$ can be expressed as $$e_e = e_R - e_t$$
$$= A(t)\,(K(t)\sin[\omega t + \phi(t) + \omega\tau]$$
$$- C(t)\sin[\omega t + \phi(t) + \omega(\tau_1+\tau_2) + f(t)] \quad (9)$$

$$c^2 = K_1^2f_1^2 + K_1^2f_2^2$$

$$\tan f = f_2/f_1 \quad (10)$$

This error signal is now fed to the two synchronous detectors 35 and 36. The reference signals for the synchronous detectors 35 and 36 are provided by the sampled signal from the Transmitter 10.

MODULATED INTERFERENCE RECEIVED THROUGH A SINGLE PATH OR MULTIPATHS

Let the interference be in the form of a modulated signal where the modulation index and frequency are completely arbitrary. In general, such a signal at its source can be written as $$e(t) = A(t)\sin[\omega t + \phi(t)] \quad (1)$$

where $A(t)$ and $\phi(t)$ are slowly varying functions of time with respect to $\omega t$. If this interference arrives at the receiver through multiple paths the received interference can be expressed as $$e_R(t)=A(t)\sum_i^N b_i \sin[\omega t+\phi(t)+c_i] \quad (11)$$

where $N$ is the total number of paths through which the interference arrives at the receiver. The amplitude factor $b_i$ and the phase $c_i$ for the $i^{th}$ path denote how the interference is reduced in amplitude and delayed in time while propagating along this path. In general, both $b_i$ and $c_i$ will be very slowly varying functions of time. In a system where the propagation paths for the interference do not change with time, $b_i$ and $c_i$ will be constant.

Since $e_R$ can also be written as $$e_R(t)=A(t)\left[\sin[\omega t+\phi(t)]\sum_i^N b_i\cos c_i + \cos[\omega t+\phi(t)]\sum_i^N b_i \sin c_i\right] \quad (12)$$

one may further write $$e_R(t)=A(t)\,K\sin[\omega t+\phi(t)+\omega\tau] \quad (13)$$

where $$K^2=\left(\sum_i^N b_i\sin c_i\right)^2+\left(\sum_i^N b_i\cos c_i\right)^2 \quad (14)$$

and $$\tan\omega\tau=\sum_i^N b_i\sin c_i\left[\sum_i^N b_i\cos c_i\right]^{-1} \quad (15)$$

Thus, the spectral characteristics of the interference as it appears at the receiver are the same as those at its source except that the amplitude is reduced by a factor $K$ and the spectrum is delayed by a time $\tau$, particularly when $b_i$ and $c_i$ are constant functions of time.

If $b_i$ and $c_i$ are slowly varying functions of time, $K$ and $\tau$ will also be slowly varying functions of time. In an idealized interference cancellation arrangement one needs to synthesize $K$ and $\tau$ accurately in order to make the sample signal identical to $e_R(t)$ in "real time." Again, since both $K$ and $\tau$ cannot change very rapidly with time the servo system does not need to change rapidly to track the variation in $K$ and $\tau$.

TRACKING LOOP ANALYSIS

The synchronous tracking loops are so designed that the loop equations involving $K_1$ and $K_2$ become $$d^2K_1/dt^2=G_1e_1 \quad (16)$$

$$d^2K_2/dt^2=G_2e_2 \quad (17)$$

where $G_1$ and $G_2$ are the equivalent loop gains. The functions $e_1$ and $e_2$ involving the cross-correlation products are not the same for amplitude and frequency modulated interference. In the case of amplitude modulated interference, $\phi(t)$ is a constant and, with no loss of generality, can be set equal to zero. For such a case similar analyses may be obtained for pulse and phase modulation systems showing the criteria for use in cancelling interference in such systems. The pulse modulation system is merely a special form of amplitude modulation while the analysis for frequency modulation is basically applicable to phase modulation as well. In Eqs. (16) and (17)

$$e_1=\int_0^{\pi/\omega}(g_1-g_2)\,dt-\int_{\pi/\omega}^{2\pi/\omega}(g_1-g_2)\,dt \quad (18)$$

and $$e_2=\int_0^{\pi/\omega}(g_3-g_4)\,dt-\int_{\pi/\omega}^{2\pi/\omega}(g_3-g_4)\,dt \quad (19)$$

where $$g_1=A(t)K(t)\sin(\omega t+\alpha_1)$$
$$g_2=A(t)C(t)\sin(\omega t+\alpha_2)$$
$$g_3=A(t)K(t)\cos(\omega t+\alpha_1)$$
$$g_4=A(t)C(t)\cos(\omega t+\alpha_2)$$

and $$\alpha_1=\omega\tau-\omega\tau_3$$
$$\alpha_2=\omega(\tau_2-\tau_3)+f(t)$$

For the frequency modulated signal $A(t)$ is a constant but $\phi(t)$ is not zero. In act, it is a time-varying function given by $\phi(t)=\Delta t\sin\omega_m t$ where $\Delta$ is the deviation angular frequency and $\omega_m$ is the frequency of the audio-information. For most problems of practical interest, the deviation frequency $\Delta$ is a very small fraction of the operating angular frequency $\omega$; i.e., $\Delta/\omega$ is $<<1$. The corresponding expressions for $e_1$ and $e_2$ for the frequency modulated interference can be expressed as $$e_1=A\left[\int_0^{\pi/\omega}K(t)\sin[\omega t+\phi(t)+\alpha_1]dt-\int_{\pi/\omega}^{2\pi/\omega}K(t)\sin[\omega t+\phi(t)+\alpha_1]dt-\int_0^{\pi/\omega}C(t)\sin[\omega t+\phi(t)+\alpha_2]dt+\int_{\pi/\omega}^{2\pi/\omega}C(t)\sin[\omega t+\phi(t)+\alpha_2]dt\right] \quad (20)$$

$$e_2=A\left[\int_0^{\pi/\omega}K(t)\cos[\omega t+\phi(t)+\alpha_1]dt-\int_{\pi/\omega}^{2\pi/\omega}K(t)\cos[\omega t+\phi(t)+\alpha_1]dt-\int_0^{\pi/\omega}C(t)\cos[\omega t+\phi(t)+\alpha_2]dt+\int_{\pi/\omega}^{2\pi/\omega}C(t)\cos[\omega t+\phi(t)+\alpha_2]dt\right] \quad (21)$$

Let it be assumed the $K$ and $\alpha_1$ are constant functions of time. Also, let $C(t)$ be verly slowly varying functions of time such that it can be brought out of the integral for the range of integration under consideration. Under these circumstances, then, for $0\le\alpha\le 2\pi, 0\le\beta\le 2\pi$, the integral defined by $E_1$ can be written as $$E_1=\int_\beta^\alpha K(t)\sin[\omega t+\phi(t)+\alpha_1]\,dt$$

$$\simeq\left(\frac{K}{2i}\left[\int_\beta^\alpha\frac{d(e^{-i[\omega t+\phi(t)+\alpha_1]})}{i[\omega+\dot\phi(t)]}\right]+\left[\int_\beta^\alpha\frac{d(e^{-i[\omega t+\phi(t)+\alpha_1]})}{i[\omega+\dot\phi(t)]}\right]\right) \quad (22)$$

If now $|\phi(t)| << \omega$ for all $t$ within the range of integration, one may also write $$E_1 \simeq -\frac{K}{\omega}\left(\cos\left[\omega t+\phi(t)+\alpha_1\right]\Big|_{\beta}^{\alpha}\right) \qquad (23)$$

Similarly, the integral defined by $E_2$ can be written as $$E_2=\int_{\beta}^{\alpha} K(t)\cos\left[\omega t+\phi(t)+\alpha_1\right]dt$$

$$\simeq\frac{K}{\omega}\left(\sin\left[\omega t+\phi(t)+\alpha_1\right]\Big|_{\beta}^{\alpha}\right) \qquad (24)$$

Making use of these equations, then, one obtains $$e_1=A/\omega(K\left[2\cos(\phi_1+\alpha_1)+\cos\alpha_1+\cos(\phi_2+\alpha_1)\right]$$
$$-\bar{C}(t)\left[2\cos\alpha_2(\pi/\omega)+\cos\alpha_2(0)+\cos\alpha_2(2\pi/\omega)\right]) \qquad (25)$$

and $$e_2+-(A/\omega)(K\left[2\sin(\phi_1+\alpha_1)+\sin\alpha_1+\sin(\phi_2+\alpha_1)\right]$$
$$-C(t)\left[2\sin\alpha_2(\pi/\omega)+\sin\alpha_2(0)+\sin\alpha_2(2\pi/\omega)\right]) \qquad (26)$$

where $$\phi_1=\frac{2\Delta\pi}{\omega}\sin\frac{\omega_m\pi}{\omega}\simeq\frac{\Delta\omega_m}{\omega^2}\pi^2$$

and $$\phi_2=\frac{2\Delta\pi}{\omega}\sin\frac{2\omega_m\pi}{\omega}\simeq4\pi^2\frac{\Delta\omega_m}{\omega^2}$$

and a bar over $C(t)$ indicates some averaging over a very minute time interval, such that $C(t) \simeq \bar{C}(t)$.

If the rates at which $f_1$ and $f_2$ change with time are negligible in comparison with the operating angular frequency $\omega$.

$$\cos\alpha_2(\pi/\omega)=\cos\alpha_2(0)=\cos\alpha_2(2\pi/\omega)=\cos\alpha_2(t) \qquad (27)$$

and $$\sin\alpha_2(\pi/\omega)=\sin\alpha_2(0)=\sin\alpha_2(2\pi/\omega)=\sin\alpha_2(t) \qquad (28)$$

For the same approximation indicated in Eqs. (27) and (28), we may finally write $$e_1=4A/\omega\left(K\left[\cos\alpha_1+1.5\frac{\Delta\omega_m}{\omega^2}\pi^2\sin\alpha_1\right]-K_1(t)\right) \qquad (29)$$

$$e_2=4A/\omega\left(K\left[\sin\alpha_1+1.5\frac{\Delta\omega_m}{\omega^2}\pi^2\cos\alpha_1\right]-K_2(t)\right. \qquad (30)$$

A comparison of these two controlling signals with the corresponding ones for the amplitude modulated interference shows that as long as the second term inside the bracket is very much smaller than the first in Eqs. (29) and (30), the characteristics of the control signals for the amplitude and frequency modulations are indistinguishable. In other words, if a system performs well for the amplitude modulated interference, it will also perform reasonably well for the frequency modulated interference provided $$\cos\alpha_1 \gg 1.5\frac{\Delta\omega_m}{\omega^2}\sin\alpha_1 \qquad (31)$$

$$\sin\alpha_1 \gg 1.5\frac{\Delta\omega_m}{\omega^2}\cos\alpha_1 \qquad (32)$$

The obvious solution for $\alpha_1$ satisfying the above conditions is obtained for values of $\alpha_1$ in the neighborhood of 45°. Since $\alpha_1$ is a function of frequency, one may expect that such values of $\alpha_1$ cannot be physically realized over a wideband such as an octave. The maximum error, however, resulting due to the frequency modulation alone occurs when $\alpha_1$ is $p\pi$ and $(2p+1)\pi/2$, $p$ being an integer. Under such circumstances, the error in $k_1$ or $k_2$ will be of the order of $$|\Delta k_1|_{max}=|\Delta k_2|_{max}=1.5\frac{\Delta\omega_m}{\omega^2}\pi^2 \qquad (33)$$

If, for example, $$\Delta=2\pi \times 50 \times 10^3$$
$$\omega_m=2\pi \times 3 \times 10^3$$
$$\omega=2\pi \times 300 \times 10^6$$

$$|\Delta k_1|_{max}=|\Delta k_2|_{max}\simeq2.5\times10^{-8} \qquad (34)$$

Since $\Delta k_1$ and $\Delta k_2$ eventually determine the limiting cancellation potential, one may expect that for the case considered above, the ultimate degree of cancellation potential will be more than 140 db.

From the foregoing it may be seen that we have invented a system for providing active interference signal cancellation by linear processing of a sample of the interference signal. Further the system employs a feedback loop for continuous self cancellation without human intervention. We have also devised an arrangement for rendering the cancellation system itself immune from interferences.

Additionally we have invented novel signal controllers which allow the accurate sampling and amplitude control of RF signals over wide dynamic range. As a result of each of these advances we have produced a method and system for interference cancellation capable of performance superior to those previously available.

The above-described embodyments and process is furnished as illustrative of the principles of this invention and are not intended to define the only embodyments possible in accordance with our teaching. Rather, protection under the United States Patent Law shall be afforded to use not only to the specific embodyments shown but to those falling within the spirit and terms of the invention as defined by the following claims.

We claim:

1. An interference cancellation system comprising:

a source of a wanted signal subject to interference from a reference or other coherent signal;

means for sampling the wanted signal and interference;

means for chopping and interrupting the wanted signal and interference at a known rate;

means for sampling the interrupted signal plus interference;

means connected to said interrupted signal sampling means for detecting the interrupted signal synchronously with the sampled interference signal;

means for deriving a control signal proportional to the level of the interference signal input to the receiver;

a pair of controllers responsive to the control signal from the last means for varying the amplitude of R.F. signals passed therethrough;

means for applying a sample of the reference signal to the input of both said controllers;

means for shifting the phase of the output of one of the controllers by a known phase angle $\alpha$;

means for summing the output of the one controller with the phase shifted output of the second controller;

means for subtractively combining the said summed outputs with the wanted signal and interference; and means for applying the output of said last means to the input of the receiver.

2. The combination in accordance with claim 1 wherein the phase shift angle $\alpha$ is in the order of 90°.

* * * * *